Dec. 16, 1969    A. G. FORD ET AL    3,483,839
RIGID/NON-RIGID SIDEBOARD CAPTURED AIR BUBBLE VEHICLE
Filed May 17, 1968

INVENTORS
ALLEN G. FORD
ROBERT A. WILSON

BY

ATTORNEYS

United States Patent Office 3,483,839
Patented Dec. 16, 1969

3,483,839
RIGID/NON-RIGID SIDEBOARD CAPTURED AIR BUBBLE VEHICLE

Allen G. Ford, Rockville, and Robert A. Wilson, College Park, Md., assignors to the United States of America as represented by the Secretary of the Navy
Filed May 17, 1968, Ser. No. 730,137
Int. Cl. B60v 3/06
U.S. Cl. 114—67                                        9 Claims

ABSTRACT OF THE DISCLOSURE

Stability of surface effect vehicles such as the captured air bubble (CAB) type is increased by flexible sidewalls in the forward portion of the vehicle. The flexible sidewalls withstand column loading but are weak in lateral loading so that in combined sideslip and pitching attitudes, the flexible forward sidewalls do not react to lateral hydrodynamic forces and the vehicle remains stable.

---

The invention described herein may be manufactured and used by or for the Government of the United States of America for governmental purposes without the payment of any royalties thereon or therefor.

BACKGROUND AND SUMMARY

A CAB vehicle having full length rigid sideboards becomes unstable in yaw when in a bow down attitude (negative pitch angle) during a sideslip (e.g. turning). This instability occurs because the resultant lateral hydrodynamic force on the vehicle acts on a position ahead of the vehicle center of gravity. The yaw instability manifests itself in a severe reduction of turn radius leading to broaching or roll instability resulting in vehicle overturn.

Accordingly, it is among the objects of the present invention to provide:

An improved CAB vehicle arrangement enabling yaw stability;

An improved sidewall configuration for a CAB vehicle employing a laterally compliant, column loaded flexible sidewall portions enabling sideslipping and yawing without instability such as broaches or deep, sudden rolls;

An improved CAB vehicle of lightweight construction employing yaw stabilizing elements enabling stable turns.

A feature of the present invention is the provision of a compliant forward end seal pressurized by the plenum and attached to the forward ends of the flexible sidewalls to exert longitudinal tension on the sidewalls whereby the sidewalls are constrained to act as flat plates hydrodynamically.

BRIEF DESCRIPTION OF THE DRAWINGS

The above objects as well as other features and advantages will be better understood by reference to the following description and drawings in which like numerals represent like parts and in which.

DETAILED DESCRIPTION AND OPERATION

Figure 1:
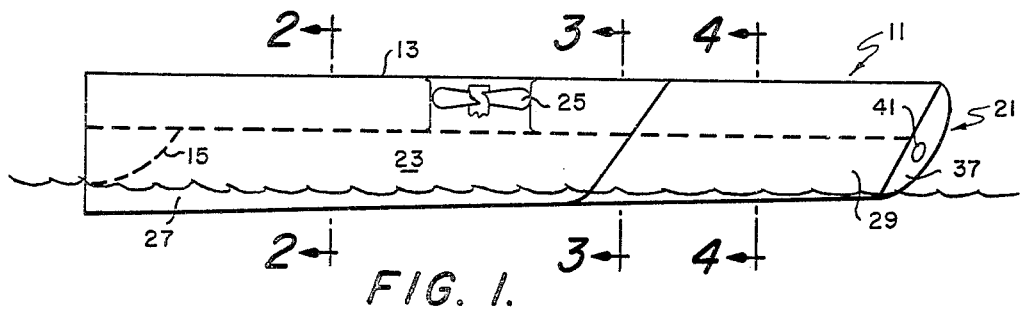
FIG. 1 is a simplified side view of a CAB vehicle incorporating the flexible sidewalls and forward end seal according to the invention.
Figure 2:
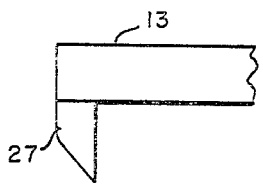
FIGS. 2–4 are views of transverse cuts of 2—2, 3—3, and 4—4 indicated in FIG. 1.
Figure 3:
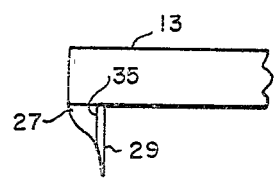
Figure 4:
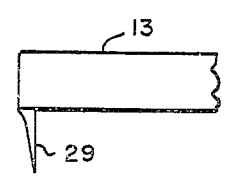

Referring to FIG. 1 a CAB vehicle 11 has a hull 13, an aft seal 15 of any suitable well-known construction, and opposing sidewalls 17 and 19 extending to a forward seal 21. The vehicle supporting bubble is confined in the space 23 defined by the sidewalls and end seals and is sustained by a fan 25 located in the hull.

According to the invention the respective opposing sidewalls have aft sideboard sections 26, 27 of rigid construction and forward non-rigid sections 28, 29. Each rigid sideboard section 28, 29 extends for about 60% to 80% of the bubble length. The shorter the turning radius desired, the higher the percentage length of the rigid sideboards.

Figure 6:
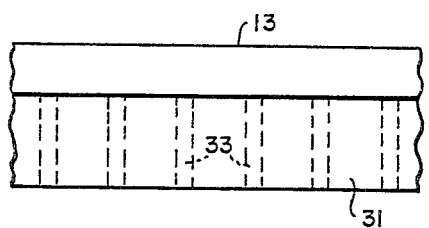
FIG. 6 is a view of part of a flexible sidewall section fabricated according to the principles of the invention.

The forward sidewall sections are each made of any suitable non-rigid flexible material capable of columnar loading and lateral deflection including, preferably, bending. For example, a B. F. Goodrich, Inc. product known as "Airmat" is suitable. Alternatively, as shown in FIG. 6, the material may be fabricated of canvas or of fabric 31 coated with rubber sewn, bonded or laminated into sheet form and having embedded therein a plurality of spaced-apart columnar strips 33 made of spring steel. The columnar strips may also be made of fiberglass, plastic or other material having flexible bending characteristics. The strips 33 are oriented in the sheet 31 so that their bending mode is in a transverse plane.

Figure 5:
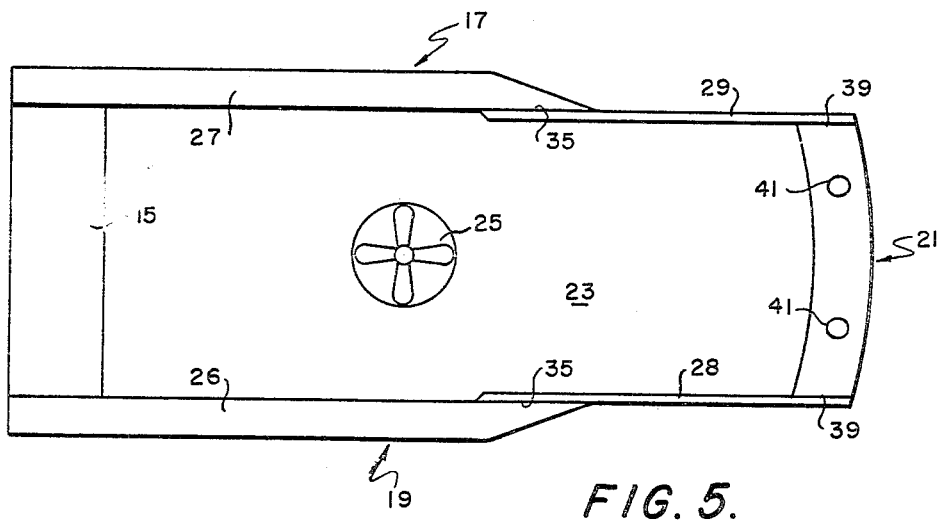
FIG. 5 is a plan view from the vehicle underside of the improved CAB vehicle according to the invention.

As shown in FIG. 5, the flexible forward sidewall sections 28, 29 are attached to the inboard surface of the respective rigid after sideboards 26, 27 to form a strong lap joint 35. The upper portion of each sidewall 28, 29 is overlappingly attached or joined in any suitable manner to the side of hull 13 so that each of the flexible sidewall sections 28, 29 is secured on two sides to rigid portions of the vehicle.

As best seen in FIGS. 1 and 5, the forward seal 21 is composed of flexible, compliant material which may be elastic and is secured in any suitable manner at its top to the forward end of the hull 13. The forward seal 21 is preferably shaped sheet material such as nylon, rubber or rubberized fabric in the form of a bag-like protrusion 37 which, as shown, is extendible forward under pressure of the bubble in space 23 terminating at its bottom in a positive trim angle. The bag has port and starboard edges 39 and 41 which are secured in any suitable manner, as by clamps, welding or bonding to the respective forward edges of the port and starboard sidewall sections 28 and 29 and at its top to the forward end of the hull. The forward seal 21 may be provided with vents 41 of predetermined dimensions to enable control of the shape of the seal and to prevent failure due to bubble pressure surge.

Because the forward seal 37 protrudes in a forward bulge under bubble pressure, longitudinal tension is exerted by the forward seal on each of the flexible sidewall sections 28, 29 enabling the bottom surfaces of sections 28, 29 to remain essentially straight and not curved or rippled.

Thus there is provided according to the invention at the forward portion of a CAB vehicle an arrangement of flexible sideboards and a flexible, elastic forward seal enabling lateral movement of the sidewalls or at least a portion thereof so that, in a vehicle turn, the sidewalls may bend in coordinated manner under elastic restraint of the forward seal. Therefore, instead of the forward portions of the sidewalls "digging" into the water during a turn, they will curve or bend together to present planeing or lifting surfaces to the water surface enabling sideslip without plowing. For example, in a right hand turn, the sidewalls will bend to be concave in the direction of the turn to enable slippage to the left.

Obviously many modifications and variations of the present invention are possible in the light of the above teachings. It is therefore to be understood that the invention may be practiced otherwise than as specifically described.

What is claimed is:

1. An improved side and forward seal arrangement for a CAB vehicle comprising:
   opposing rigid sidewall portions attached to the hull for laterally confining at least the after half of the bubble;
   opposing flexible sidewall portions, each attached to a rigid sidewall portion and to the hull for laterally confining the remaining forward portion of the bubble, said flexible sidewall portions being arranged for columnar loading and lateral movement; and
   forward seal means dependingly attached to the hull and at its sides to the flexible sidewalls and arranged for movement with the lateral movement of the flexible sidewalls to maintain the integrity of the bubble.

2. The improved side and forward seal arrangement according to claim 1 wherein the lateral movement of said flexible sidewall portions include bending and wherein said forward seal comprises material of characteristics enabling its compliance with the bending movement of the flexible sidewalls.

3. The improved side and forward seal arrangement according to claim 1 wherein said forward seal means comprises compliant sheet material means extendible to a forwardly protruding bulge under bubble pressure to thereby exert longitudinal tension on the flexible sidewall portions.

4. The improved side and forward seal arrangement according to claim 1 wherein the extent of the rigid sidewall portion is from about 60% to about 80% of the bubble length.

5. The improved side and forward seal arrangement according to claim 3 wherein the forward seal means has a vent for the bubble.

6. The improved side and forward seal arrangement according to claim 3 wherein the compliant sheet material means comprises elastic means.

7. The improved side and forward seal arrangement according to claim 3 wherein said forward seal means comprises a sheet of plastic material.

8. The improved side and forward seal arrangement according to claim 3 wherein said forward seal means comprises canvas.

9. The improved side and forward seal arrangement according to claim 1 wherein said flexible sidewall portions comprises sheet material having longitudinally spaced apart resilient strips for bending in essentially transverse planes of the vehicle.

References Cited

UNITED STATES PATENTS

| | | | |
|---|---|---|---|
| 3,205,847 | 9/1965 | Smith | 114—67 |
| 3,342,278 | 9/1967 | Cocksedge | 114—67 |

ANDREW H. FARRELL, Primary Examiner